June 22, 1954  R. A. MULLER  2,681,681
DETACHABLE TIRE CHAIN HOLDING DEVICE
Filed April 3, 1951  2 Sheets-Sheet 1
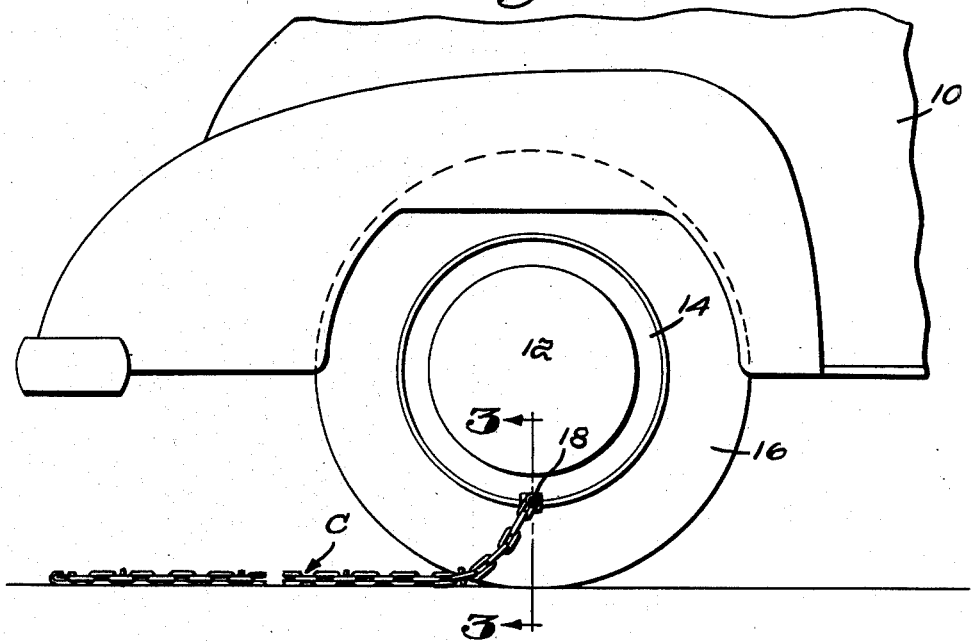
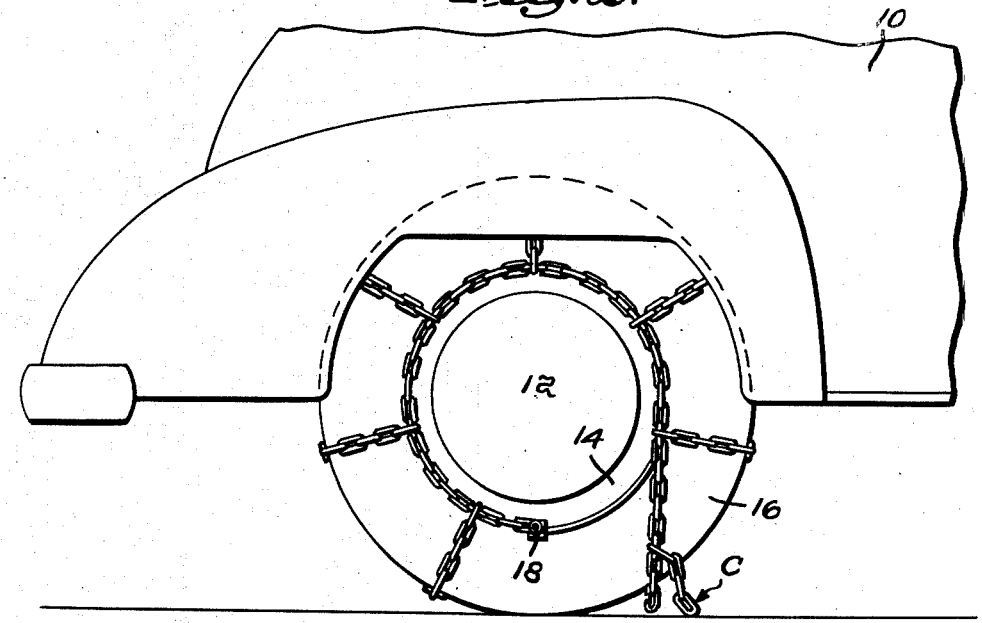
Inventor:
Robert A. Muller,
by Munroe H. Hamilton
Attorney June 22, 1954  R. A. MULLER  2,681,681
DETACHABLE TIRE CHAIN HOLDING DEVICE
Filed April 3, 1951  2 Sheets-Sheet 2
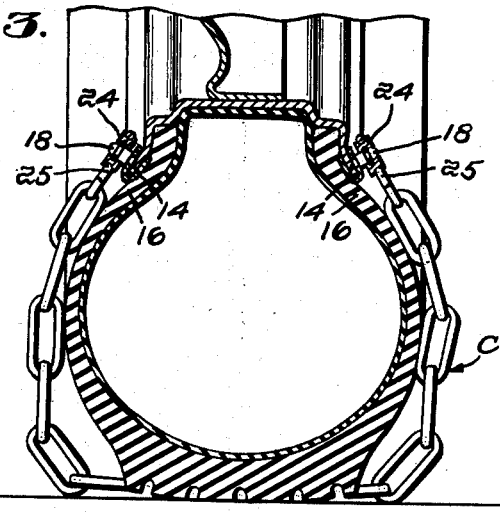
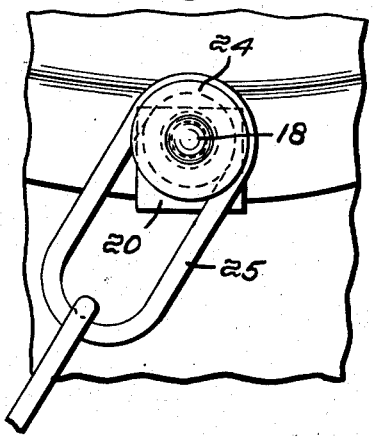
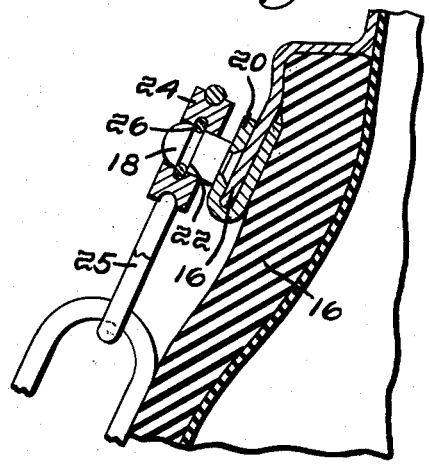
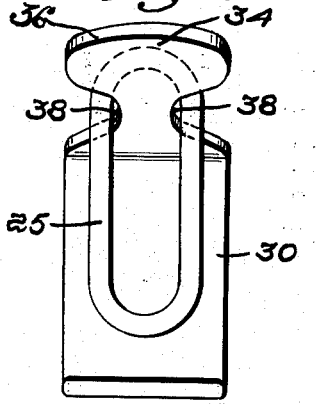
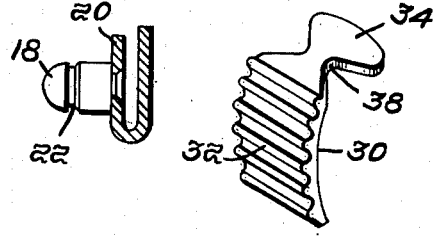
Inventor:
Robert A. Muller,
by Munro W. Hamilton
Attorney Patented June 22, 1954

2,681,681

UNITED STATES PATENT OFFICE 2,681,681

DETACHABLE TIRE CHAIN HOLDING DEVICE

Robert A. Muller, New London, N. H., assignor of one-fourth to Robert B. Muller and one-fourth to Donald L. Muller, both of New London, N. H.

Application April 3, 1951, Serial No. 219,058

2 Claims. (Cl. 152—216)

This invention relates to an improved tire chain holder which is designed to be used as an aid to installing tire chains on automobile wheels, and especially as a means of detachably holding one end of a tire chain while the remaining portions of the chain are being drawn or passed around the tire into a position to be secured to the held end.

A considerable number of devices have been suggested heretofore for dealing with the troublesome problem of installing tire chains on a car, especially where, as frequently happens, the need for the chains arises while the car is on the road where conditions make it difficult to reach under the wheels to place the chains in the correct position and to then fasten the ends together. In almost all cases these earlier devices have been subject to the objection that they require special handling and installation and the time and expense involved in using such equipment renders them impractical or unsatisfactory. Hence, they have not been adopted and used.

It is an object of the present invention to deal with the problems indicated and to devise a novel tire chain holder which can be easily and simply installed on a car wheel and left there as a more or less permanent part of this member during normal driving conditions, and yet the chain holder is constantly held in a position such that it is always conveniently available to aid in installing chains where such an operation becomes necessary. Another object of the invention is to design a chain holder device of extremely simple construction which may, in one form, require no separate holding part for attaching itself to a wheel and, consequently, can be made and sold very cheaply so that all car operators can afford to buy and use the holders.

These and other objects and novel features will be more fully understood and appreciated from the following description of a preferred embodiment of the invention selected for purposes of illustration and shown in the accompanying drawings, in which Fig. 1 is a side elevational view of a portion of a vehicle body and wheel in which the tire chain holder of the invention has been illustrated in one operative position at the start of attaching a tire chain to the wheel;

Fig. 2 is a view generally similar to Fig. 1 but further illustrating the chain in a more completely installed position and in readiness to have ends thereof secured together;

Fig. 3 is a cross-sectional view taken on the line 3—3 of Fig. 1, showing the chain holder of the invention attached to the wheel and having the links of a chain member engaged therewith;

Fig. 4 is a detailed fragmentary elevational view further showing the holder of the invention and one means of engaging a chain link therewith;

Fig. 5 is an elevational view, partly in cross-section, of the parts shown in Fig. 4 but turned at right angles;

Fig. 6 is a detailed cross-sectional view of one form of tire chain holder;

Fig. 7 is a perspective view illustrating another desirable form of holder employed in the invention; and Fig. 8 is a perspective view of the holder shown in Fig. 7 and viewed from the opposite side to indicate corrugated gripping surfaces.

In the structure shown in the drawings, numeral 10 denotes the body of a vehicle having a typical automotive type wheel 12 including a rim 14 on which is mounted a tire 16 of the pneumatic type. At the other side of the tire 16, as shown in Fig. 1, there has been illustrated a conventional link type tire chain denoted by the arrow C and made up of a plurality of links joined together in the customary manner.

The wheel and chain assembly described is intended to be representative of the standard type of equipment used in pleasure cars, as distinguished from wheel and chain equipment used in heavy trucks, tractors, and various other vehicles. The invention, although not limited to pleasure type vehicles, will be described with reference to chain installation on such vehicles partly due to the fact that pleasure cars present one of the greatest problems in tire chain installation. The reason for this latter fact is found in the relatively low skirted construction of fenders and mud-guards on these cars as now commonly manufactured and sold. It is extremely difficult to place a chain over the tire in this type of wheel because of the fender interference, unless the wheel is raised or jacked up, or the operator is able to lie underneath the lower end of the car so as to avoid interference from the fender.

I have found that I can avoid these difficulties and eliminate the need for either jacking up the wheel or crawling underneath the car. I accomplish this objective by attaching special tire chain holder means to the wheel in a position such that it is an extremely simple operation to install the chains.

In accordance with the invention I provide a chain holder having an insert piece adapted to be located between the rim of an automobile wheel and a tire mounted thereon and maintained by the pressure of the tire when inflated so that the insert piece can be permanently held in place during operation of the vehicle, and is at all times available for use.

The holder in one desired form may include a projection or stud 18 which is supported on a body portion 20 consisting of a flat strip of material, preferably a light metal such as aluminum, or the like. The strip may, if desired, be folded over upon itself to form a U-shaped clip member, one end of which can be inserted, as shown in Fig. 5, between the tire rim 14 and a tire 16 when the latter member is in a deflated condition. The projection 18 may desirably comprise an annular stud formed with a rounded head 20 and a reduced neck 22, as shown in Figs. 5 and 6. Adapted to detachably engage around the reduced neck of the projection 18 is a snap fastening 24 consisting of an annular member having an inner spring 26. The size of the snap fastening 24 is chosen such that it can be snapped into a link 25 of the tire chain to thus detachably hold the link portion.

Another even simpler form of tire chain holder which I have devised has been illustrated in Figs. 7 and 8, wherein I have shown a holder including an insert piece 30 which is preferably of a slightly curved construction, the arc of curvature of which may conveniently correspond to the contour of the side wall of the wheel rim against which it is to bear. One surface of the insert piece 30 is preferably interrupted in some suitable manner, as by corrugations 32, which tend to become slightly embedded in a tire wall when the latter member is in an inflated condition, thus more securely locking the insert piece in place.

On the part 30 is mounted a special projection means consisting of a relatively thin lug portion 34 which has a curved upper edge 36 and which is cut away at its under portions to form a reduced neck portion 38. Preferably the neck portion will be made of a size such that it approximately corresponds to the span or width of the space included within the sides of the tire link 25. At the same time the distance measured from one tip of the lug 34 to that portion of the neck farthest away from it will exceed the length of the opening in the link 25, thus providing for the link being easily and quickly hooked over the lug and then turned at right angles so that the rounded end of the link fits snugly about the reduced neck 38. From this position reversing steps described quickly provide for disengagement of the link from the lug, as will be readily perceived.

In installing the device in one or the other of the forms above described, the insert piece or body portion is first inserted between the rim 14 and the tire 16 by forcing this member into place or, if necessary, by deflating the tire 16, locating the insert, and again reinflating the tire. The operation described is repeated to locate a second chain holder on the same wheel and in approximately the same position on its circumference between the inner side of the tire and its corresponding rim portion. If air is released from the tire then obviously both chain holders may be inserted in their respective positions at the same time, with the tire thereafter being inflated.

In the positions described, holders on each one of the wheels of the vehicle are thereafter left in place during the normal operation of the vehicle. When, however, a need arises for installing tire chains, the free links of the chain C are engaged over the projecting part of the chain holder in the manner described, and the remaining part of the chain is stretched out away from the wheel in either a forward or rearward direction, with the latter having been illustrated in Fig. 1.

The car is then moved rearwardly for a distance sufficient to cause the tire chain to assume the position shown in Fig. 2. In this position the links of the chain on the chain holder can readily be disengaged from the holder and secured to the opposite end of the chain, making use of the usual type of locking tongue employed for this purpose. The operation then is repeated for engaging the chain on the inner side of the wheel.

From the foregoing description it will be apparent that I have provided a simple and efficient chain holding device which is very easily attached to an automobile wheel and which may be permanently held there during the normal operation of the vehicle, it being at all times in a position to serve as a chain holder when required. It is contemplated that the chain holder may be made of various materials, as has already been noted, and in this connection it is pointed out that a suitably light material may be employed to avoid any undesirable changes in the balancing of the tire wheel. It is also contemplated that the chain holders, if made of an appreciably heavier material, might well comprise a convenient means of applying wheel balancing weights and, at the same time, constitute a chain holder, as described. It may also be desired to utilize other means of attaching the chain holder, as by associating it with the wheel rim or with the wall of the tire itself in various other ways.

While I have shown a preferred embodiment of the invention it should be understood and appreciated that various changes and modifications may be resorted to in keeping with the spirit of the invention as defined in the claims appended hereto.

I claim:

1. An improved tire chain holding device comprising an insert piece adapted to be located between the rim of an automobile wheel and a tire mounted thereon, said insert piece being formed of relatively light thin metal and including a pair of parallel spaced legs and a connecting base, said base being of such a width as to snugly engage the wheel rim at its periphery and to position the legs snugly against the adjacent walls of the rim, a stud fixed to the outer leg of the insert, said stud being of cylindrical form and including an annular groove, a fastener for attachment to said stud, said fastener having a rounded body portion formed with a groove to receive the inner face of a tire chain link portion and being formed with an opening in its body, the wall defining the opening in said body being formed with an annular groove to register with the groove in said stud, and an expansible member for seating in said registering grooves to secure the parts against displacement laterally of the outer leg of the insert.

2. The structure of claim 1 characterized in that the fastener is detachably attached to the stud to permit removal and insertion in the link of a chain during assembly.

References Cited in the file of this patent

UNITED STATES PATENTS

| Number | Name | Date |
| --- | --- | --- |
| 1,194,433 | Silberman | Aug. 15, 1916 |
| 1,330,194 | Krug | Feb. 10, 1920 |
| 2,020,586 | Stetson | Nov. 12, 1935 |
| 2,204,886 | Devlin | June 18, 1940 |
| 2,461,267 | Givens | Feb. 8, 1949 |